United States Patent [19]
Balistreri

[11] Patent Number: 5,588,394
[45] Date of Patent: Dec. 31, 1996

[54] AUTOMATIC ANIMAL FEEDER

[76] Inventor: Thomas R. Balistreri, 2177 W. Forest La., Anaheim, Calif. 92804

[21] Appl. No.: 522,698

[22] Filed: Sep. 1, 1995

[51] Int. Cl.[6] .............................. A01K 5/02; A01K 7/02
[52] U.S. Cl. .................. 119/51.11; 119/51.5; 119/56.1
[58] Field of Search .......................... 119/51.11, 51.12, 119/51.5, 56.1

[56] References Cited

U.S. PATENT DOCUMENTS

| | | | |
|---|---|---|---|
| 4,069,793 | 1/1978 | Gower | 119/51.13 |
| 4,079,699 | 3/1978 | Longmore et al. | 119/51.11 |
| 4,315,483 | 2/1982 | Scheidler | 119/51.11 |
| 4,665,862 | 5/1987 | Pitchford, Jr. | 119/51.11 |
| 4,722,300 | 2/1988 | Walker et al. | 119/51.11 |
| 4,805,560 | 2/1989 | Knego et al. | 119/51.12 |
| 4,981,106 | 1/1991 | Nagatomo | 119/51.11 |
| 5,046,455 | 9/1991 | Christiansen et al. | 119/56.1 |
| 5,265,560 | 11/1993 | Dobbins | 119/51.12 |
| 5,319,562 | 6/1994 | Whitehouse | 364/464.03 |
| 5,363,805 | 11/1994 | Wing | 119/51.11 |
| 5,370,080 | 12/1994 | Koepp | 119/51.11 |

Primary Examiner—Robert P. Swiatek
Assistant Examiner—Yvonne R. Abbott
Attorney, Agent, or Firm—Gordon K. Anderson

[57] ABSTRACT

An automatic animal feeder which has a structural base (22) and a vertical support (20) onto which a feed reservoir (32) is attached. A rotary feed measure having a cavity (40) inside is disposed directly beneath the reservoir and when rotated, meters a fixed volume of dry feed to a feed bin (70) positioned below. Rotation of the measure is actuated by a ballast tank (58) that is pivotally connected to the measure on outwardly extending arms (44). A water solenoid valve (78) opens on cyclic command of an electronic controller (80) filling the tank, which by virtue of its increased weight, is pulled down by gravity dumping the feed into the bin. When the tank has pivoted downwardly and is full, a syphon tube (64) dumps all of the water into a water dish (68), separate from the apparatus, and a spring (92) returns the empty tank to its reset position, thus automatically feeding and watering an animal.

12 Claims, 4 Drawing Sheets

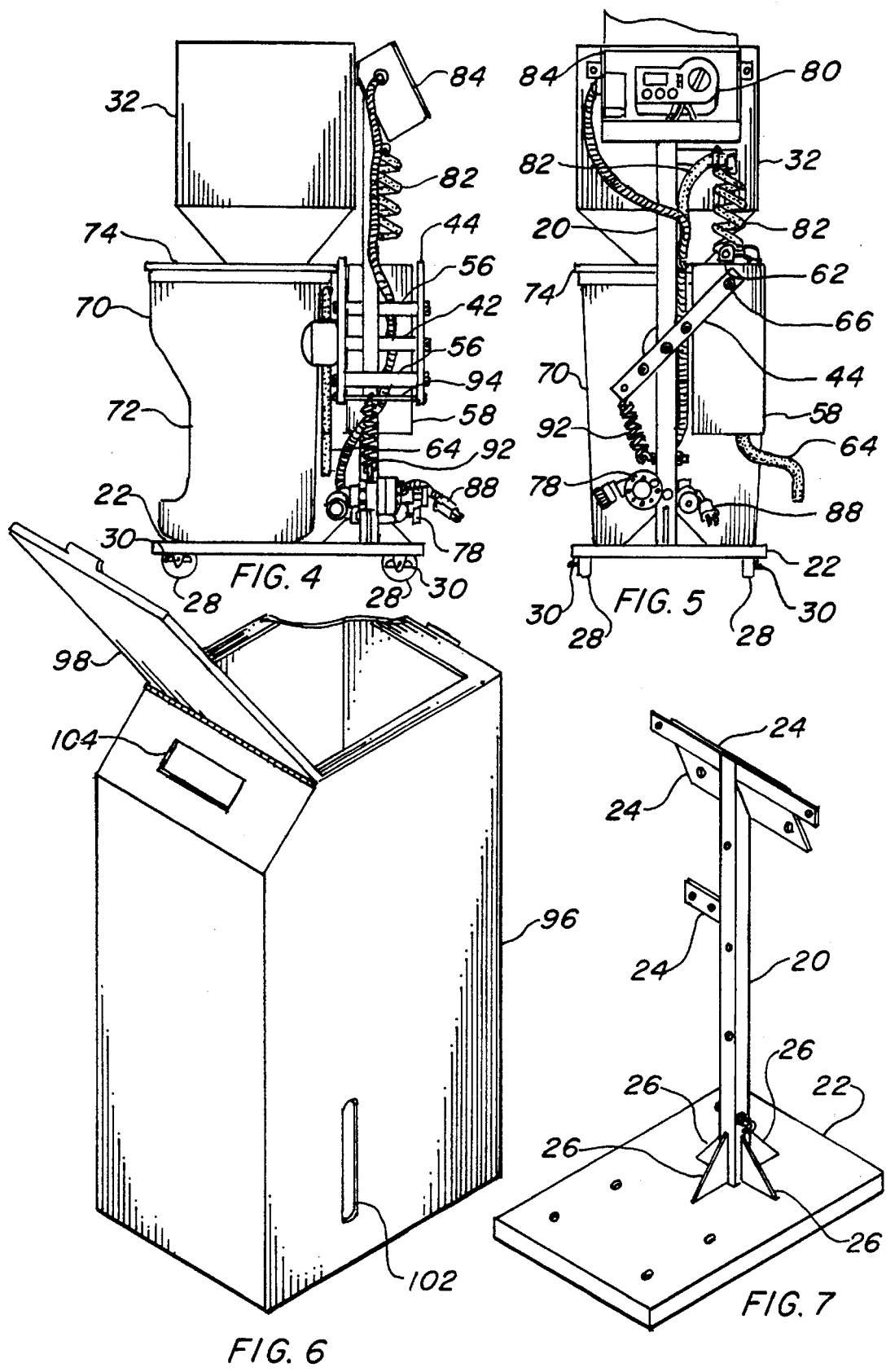

5,588,394

1

AUTOMATIC ANIMAL FEEDER

TECHNICAL FIELD

The present invention relates to animal feeders in general. More specifically, to automatic feeders that dispense food and water at timed intervals.

BACKGROUND ART

Previously, many types of animal feeders have been used in endeavoring to provide an effective means for producing a device that would unattendedly feed and water pets and various animals, at appropriate times. Prior art is replete with structure utilizing timers, motors, valves, etc., to produce the desired feeding intervals and quantities. Some feeders measure weight, some volume, and others dispense a predetermined amount that has been manually selected during a previous loading sequence. The power to energize the feeder is either supplied by an alternating current source, such as house power, or is battery operated and completely self-contained. Some feeders mix water into dry pet food, and others deliver the food as it comes from the package. Water is provided at time intervals by some prior art and is kept at a constant level by others. It does not appear that any specific trend has developed in the industry and some devices are large and take-up considerable space, and others are small, such as a carousel offering only little portions of food for small pets, such as cats. It will be noted, however, that since the interest in domestic pets is almost universal in the United States, with some two-thirds of the households having at least one dog or cat, improvements in the discipline of automatic pet food dispensing is certainly needed.

A search of the prior art did not disclose any patents that read directly on the claims of the instant invention, however, the following U.S. patents are considered related:

| U.S. Pat. No. | Inventor | Issue Date |
| --- | --- | --- |
| 5,363,805 | Wing | Nov. 15, 1994 |
| 5,265,560 | Dobbins | Nov. 15, 1994 |
| 4,981,106 | Nagatomo | Jan. 1, 1991 |
| 4,805,560 | Knego et al | Feb. 21, 1989 |
| 4,665,862 | Pitchford, Jr. | May, 19, 1987 |
| 4,079,699 | Longmore et al | Mar. 21, 1978 |

Wing, in U.S. Pat. No. 5,363,805, teaches a pet feeder in a cabinet that includes a hopper and an auger rotated by a motor that dispenses dry food directly into a bowl placed near the device. The feeder utilizes a programmer that controls the frequency and amount of food delivered into the bowl. City power is used as the source of electrical energy to operate the motor and timer.

U.S. Pat. No. 5,265,560 of Dobbins incorporates a clock or timer mechanism that rotates a sprocket upon which a timing belt is installed. The timing belt contains notches and passes through a series of belt guides compressing a spring lock trigger, opening a connecting spring loaded lid allowing the pet to eat or drink the food placed within individual trays positioned under each lid. The feeder is designed to feed a pet over a period of two and one-half days, or a weekend.

Nagatomo of Yokohama, Japan discloses a carousel-like feeder in U.S. Pat. No. 4,981,106. This feeder is rotated by an analog 24 hour clock movement operated by either batteries or electrical house power. Individual feeding segments, or boxes, with sectionized separators contain the feed. The feed boxes have flaps to drop the feed from the carousel when they pass over an opening on the floor of the round casing. The rotation is transmitted from the clock using slits at the contour of the face interfacing with stick pins in the carousel.

U.S. Pat. No. 4,805,560 issued to Knego et al discloses an automatic pet feeding device of a modular construction that is round and relatively flat. The device indexes a food tray under a lid opening. The food tray provides a number (six pairs shown) of food and water combinations. A time/motor mechanism is located in the center of a base and the food tray is supported on the motor shaft. The motor operates on household current and a pulse timer actuates every 12 hours for 10 seconds rotating the tray to an opening in the housing for access.

Pitchford, Jr. in U.S. Pat. No. 4,665,862, teaches a leveraged loading storage bin for receiving a quantity of dry particulate feed and an auger that rotates and supplies a predetermined amount of feed into a feed dish adjacent to the feeder. A direct current motor rotates the auger with a chain drive at predetermined time intervals controlled by a timer system and water is dispensed simultaneously into the dish to amalgamate the dry feed into a gravy. A separate system provides water for drinking using a float and switch to maintain the water level.

Longmore et al, in U.S. Pat. No. 4,079,699, teaches a storage hopper with slanted sides and a pair of rollers in the bottom. An alternating current drive motor directly connected to one of the rollers is actuated by a timer. The food passes through the rollers onto a weighing tray having an adjustable counterweight. When the weight is equalized, the motor is electrically locked out and deenergized and the food drops into a dish adjacent to the device. Simultaneously during the motor drive sequence, water is dispensed into a separate dish using a solenoid valve.

It may be seen from the above descriptions that timers or clock movements usually provide the time sequence and electric motors, or the like, the electromotive force.

DISCLOSURE OF THE INVENTION

It is easily seen that the need to provide an automatic animal feeder for pets or other small creatures, when the owner is away, has been with us for a long time and the present invention fills that need.

It is, therefore, a primary object of the invention to provide an automatic animal feeder that uses the weight of water as the means for dispensing a given amount of food. Prior art is replete with feeders using electricity exclusively requiring the use of electric motors and electromagnetic solenoids. While these electromotive devices provide the needed functional characteristics, they are inherently expensive, heavy, and require occasional maintenance and may have electrical deterioration from heated windings, bearing failure, or the like. The instant invention is not subjected to these anomalies as water is simply piped to a tank and a common water solenoid valve, used in sprinkler systems, opens, filling the tank with water, and the pull of gravity due to the weight increase, rotates a cavity type measure dispensing dry feed from a reservoir. This type of action is extremely simple and positive, as the weight is constant producing a repeatable energy source that is extremely reliable and few moving parts are required.

An important object of the invention is the use of reliable programmable microprocessor to control sequence and duration of operation of the water solenoid. In today's technology microprocessors have become positive, reliable, and commonplace. The microprocessor, or electronic controller, is extremely flexible, permitting the sequential presetting of the day, time and frequency of feeding, as well as the cyclic duration. Further, digital displays indicate time readouts and manual overrides, which permit operation out of sequence without disturbing the set points. A dry cell storage battery, used universally, sustains the memory when A.C. power is disengaged.

Another object of the invention is the ability of the device to not only provide fresh water for the pet, along with the dry food, but to automatically flush out the remaining water in the water dish. This is accomplished by a syphon which completely empties the water ballast tank at the end of the feeding cycle, introducing fresh water into the bowl at a relatively high volume. The water from the tank overflows the bowl taking along with it any debris that may have collected along with replenishing the bowl with fresh water.

Still another object of the invention is an optional separate water feed system that functions in the same manner as above, except it uses a discrete water solenoid valve piped in parallel with the feeder water valve. This optional feature permits altering the watering cycle to any frequency and duration according to the requirements of the individual animal.

Yet another object of the invention is its stability and portability. The feeder is large enough and heavy enough to be stable and not be tipped over by the animal, as the platform base is flat and sufficiently wide to preclude overturning. Further, casters on the bottom permit the feeder to be easily rolled into position and the locks on the wheels may be depressed immobilizing the feeder. A further object of the invention is directed to the application both in the home or pet stores and commercial kennels where pets are kept out of doors. Further, each feeder may be easily modified to utilize one controller for an entire bank of feeders, simultaneously energizing the water solenoids for both feed and water at remote locations using low voltage electrical current.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 4 is a right side view of the feeder with the enclosure removed.

FIG. 5 is a rear view of the feeder with the enclosure removed.

FIG. 6 is a partial isometric view of the enclosure with the lid open, completely removed from the invention for clarity.

FIG. 7 is a partial isometric view of the structural frame, completely removed from the invention for clarity.

BEST MODE FOR CARRYING OUT THE INVENTION

The best mode for carrying out the invention is presented in terms of a preferred embodiment with some optional features.

Figure 1:
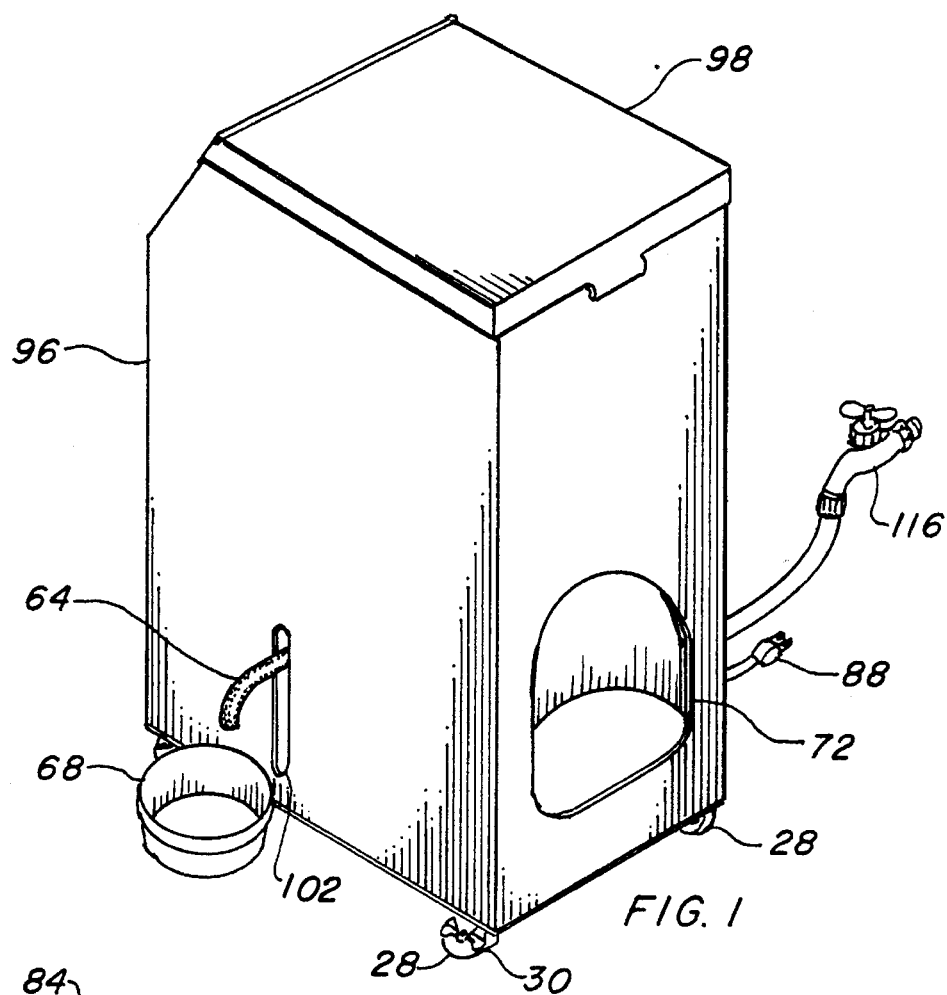
FIG. 1 is a partial isometric view of the preferred embodiment.
Figures 2, 3:
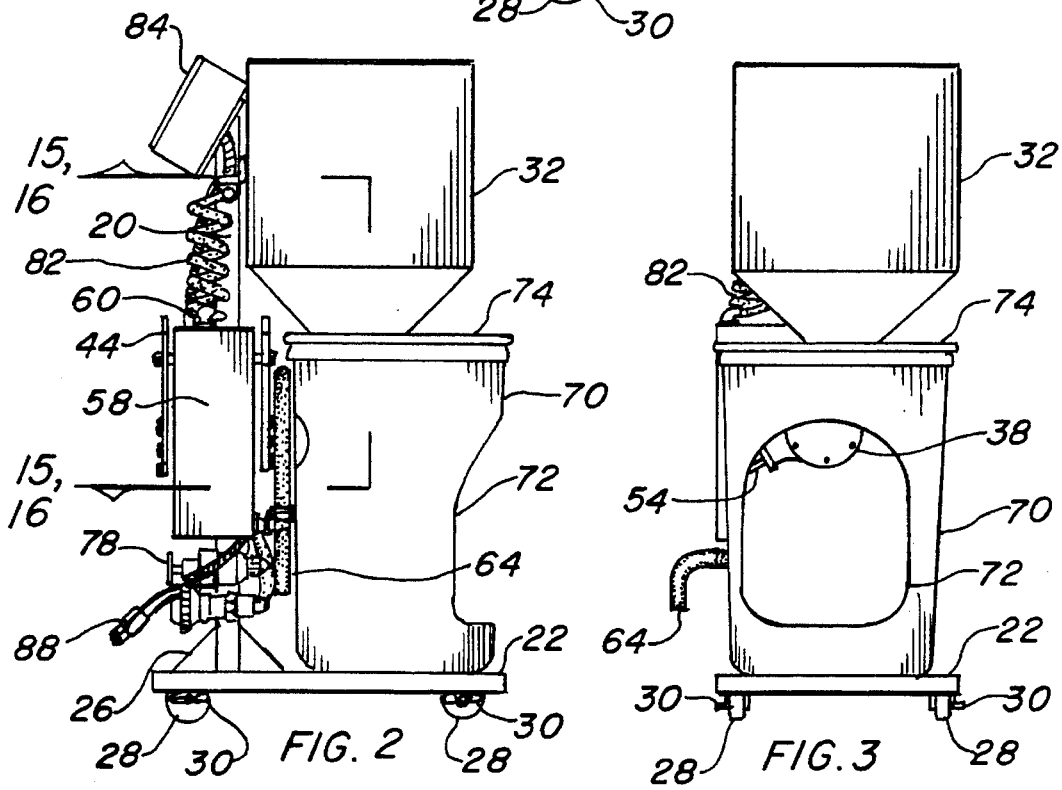
FIG. 2 is a left side view of the feeder with the enclosure removed.
FIG. 3 is a front view of the feeder with the enclosure removed.

The preferred embodiment, as shown in FIGS. 1 through 18, is comprised of mounting means in the form of a rigid vertical support structure 20 connected to a horizontal base 22, as shown in FIGS. 2, 4, 5, and singly in FIG. 7. The vertical support structure in the preferred embodiment consists of a single post having brackets 24 for mounting and gussets 26 for structural reinforcement and stability. While this form is simple and straightforward, other frames, such as four corner posts with a top peripheral member and appropriate brackets may also be used with equal ease. The base 22 may be flat with downwardly facing flanges, as shown or flanged upward and the configuration may also be round or rectangular, as illustrated in FIG. 7. In order to provide mobility, casters 28 may be included on the bottom corners of the base 22. The casters 28 preferably incorporate foot brakes 30 on all, or at least two of the casters to provide securement for the device when it is in position and yet is still movable for cleaning underneath when the occasion arises.

Figure 8:
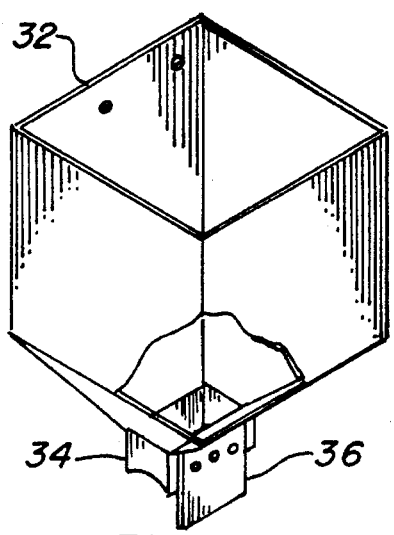
FIG. 8 is a partial isometric view of the feed reservoir, completely removed from the invention for clarity.
Figure 9:
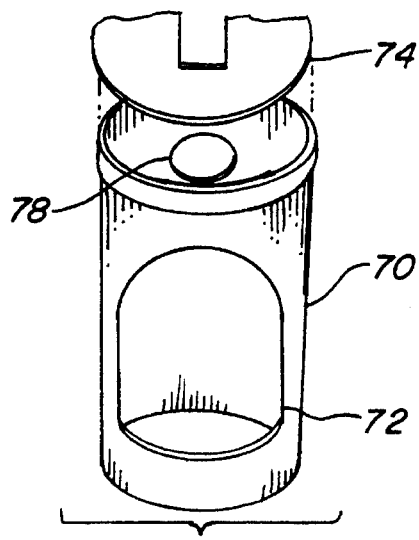
FIG. 9 is a partial isometric view of the feed bin, completely removed from the invention for clarity.

Feed storage means retains a reserve of dry animal feed 27. It should be noted that the term dry feed covers all of the animal food that is self-contained and does not require the addition of water prior to feeding. The storage means is attached to the vertical support 20 and consists of a feed reservoir 32, depicted in FIGS. 2 through 5, and individually in FIG. 8. The reservoir 32 is constructed of metal or thermoplastic, rectangular, square or round in shape with an open top, and has a funneled outlet 34 on the bottom. A flapper valve 36 is attached to one side of the outlet 34, as illustrated in FIG. 8, and distends downwardly away from the outlet. The valve 36 is flat and made of a resilient material, such as synthetic rubber. The reservoir 32 is large enough to supply food 27 for an animal for some time and, as it is sloped at the bottom, the feed 27 is ready for dispensing even when the supply is low.

Figure 12:
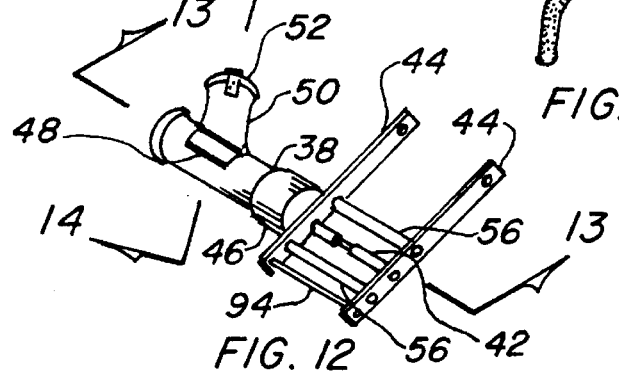
FIG. 12 is a partial isometric view of the feed measure, completely removed from the invention for clarity.
Figure 13:
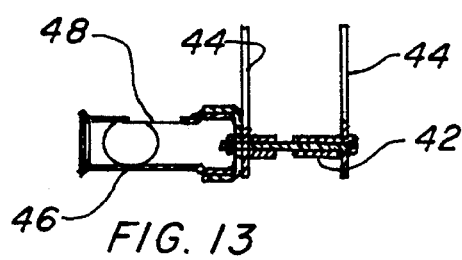
FIG. 13 is a cross-sectional view taken along lines 13—13 of FIG. 12 shown in the reset position.
Figure 14:
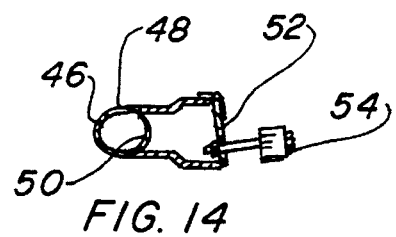
FIG. 14 is a cross-sectional view taken along lines 14—14 of FIG. 12 shown in the reset position.
Figure 15:
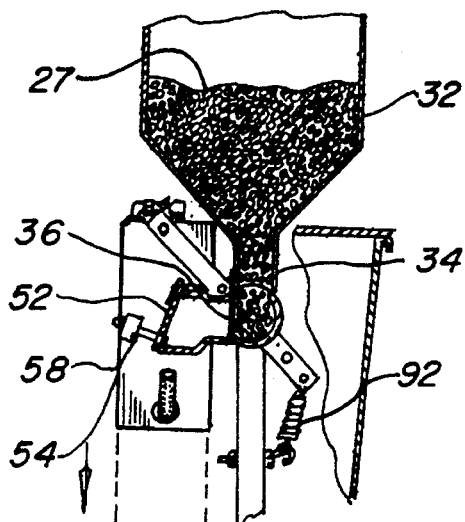
FIG. 15 is a cross-sectional view taken along lines 15—15 of FIG. 2 showing the feed measure in its reset position.
Figure 16:
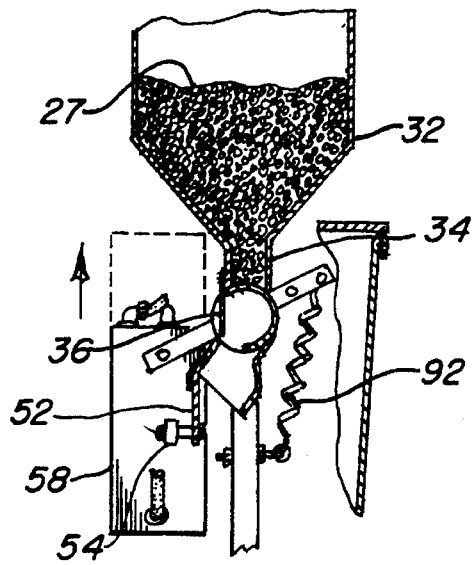
FIG. 16 is a cross-sectional view taken along lines 16—16 of FIG. 2 showing the feed measure in its dispensing position.

The food 27 is metered to the animal with weight actuated feed measuring means in the form of a rotary feed measure 38, illustrated in FIGS. 2, 4, 5, 8, and separately in FIGS. 12 through 14. The measure 38 dispenses a predetermined amount of dry feed 27 through the use of a cavity 40 positioned directly beneath the reservoir outlet 34. The relationship of the outlet 34 and measure cavity 40 is sufficiently intimate to preclude feed 27 from falling therebetween. When the cavity 40 is aligned with the reservoir 32, the feed 27 falls by gravity to fill the void. When the measure is rotated, the volume obviously stays the same, except the cavity opening is now relocated underneath, shutting off access to the reservoir 32, allowing the feed to fall down from the measure 38.

The rotary action of the measure is provided by a pivot axle 42 that is positioned between a pair of outwardly extending arms 44. The pivot axle 42 penetrates the frame vertical support structure 20 having the cavity 40 on one side and the arms 44 on the other. This rotary attachment permits the measure to revolve around the axis of the axle 42.

The cavity 40 is integral with a drum 46 that is in the shape of a 45 degree wye, depicted in FIG. 12. An opening 48 in the drum 46 is the same size as the funneled outlet 34 in the reservoir 32 and is positioned to almost touch, leaving the opening 48 in direct alignment with the outlet 34. The flapper valve 36 distends downwardly into the cavity 40, blocking off a side outlet aperture 50 in the "Y" shaped drum 46. This relationship defines the size and volume of the cavity 40. It may be seen that the physical size of the apparatus may change, as smaller pets require less food, therefore, the reservoir 32 and measure 38 may be comparatively smaller or larger than shown to fit the particular need. An adjustable stop, or filler of any type (not shown), may also be added to reduce the volume inside the cavity 40, if so desired.

The drum 46 side outlet aperture 50 preferably contains a hinged counter balanced flapper valve 52 adjacent to the cavity 40 and reservoir flapper valve 36. This counterbalanced valve 52 is illustrated in FIG. 14 and insures the integrity of the measure when in a reset position eliminating the possibility of feed leaking from the reservoir valve 36. The counter balance 54 extends outwardly from the valve 52 flapper plate and consists of a weight and shaft to relocate the center of gravity assuring closure in the reset or filling position. It should be noted that this valve 52 and its accompanying side outlet aperture 50 may be eliminated if a close tolerance fit is maintained between the reservoir outlet 34, flapper valve 36 and cavity 40.

The pair of outwardly extending arms 44 which are included in measure 38 rotate within the boundaries of an upper and lower limit stop 56, shown best in FIG. 12. These stops 56 retard the rotation when they impinge on the vertical frame support 20, as illustrated in FIGS. 4 and 5. It should also be noted that other types of stops may be utilized with equal ease provided they directly limit the rotational travel of the arms 44.

Weight is added to the arms 44 to rotate the measure 38 by the use of a pivotally mounted ballast tank 58 attached therebetween, depicted best in FIGS. 2, 4 and 5. The tank 58 may be cylindrical, or any other shape, however, rectangular is preferred and the material may be plastic, fiberglass, or metallic. The tank 58 further contains a fill connection 60, an air vent 62, and a bottom located outlet with a syphon tube 64. The attachment of the tank 58 to the arms 44 is accomplished preferably by a pair of studs 66 attached to the tank penetrating clearance holes in the arms. Water is introduced into the tank 58 through the fill connection 60 and when full, the weight of the water pulls the tank downwardly by gravity and rotates the measure 38, emptying the feed 27 from the cavity 40. When the water level reaches the uppermost loop of the syphon tube 64, the water inside automatically drains and is directed to a separate dish 68 apart from the apparatus, as shown in FIG. 1, providing a fresh supply of water for the animal.

The food 27 falls from the measure 38 into feed access means directly thereunder providing a convenient receptacle for the animal to approach the food. The feed access means defines a feed bin 70 that has an access opening 72 for the animal. The feed bin 70 is attached to the horizontal base 22 of the frame directly beneath the reservoir 32. While the bin 70 is illustrated as a round container with a separate top 74, it may be almost any configuration, such as rectangular, square, or even without a top, simply a dish attached to or integral with the base 22 provided the apparatus is enclosed. The preferred bin 70, however, is constructed of thermoplastic and contains not only the access opening 72, but an aperture 76 for clearing the measure 38. The bin 70 is illustrated separately in FIG. 9 and in place in FIGS. 2 through 5.

Weight adding and timing means are defined as a water solenoid valve 78 and electronic controller 80 that sequence intervals and duration of adding weight to the measuring means for automatic operation of the apparatus. The solenoid valve 78 is mounted on the frame vertical support structure 20 and supplies water to the ballast tank 58 through water hoses 82 to the fill connection 60 when it is energized periodically by the controller 80. The solenoid valve 78 may be any type, such as electrically actuated water control valves, sprinkler system valves in brass or plastic, with a combination angle and anti-syphon diaphram solenoid valve being preferred. In any event, the valve is energized by electrical energy creating a magnetic field to lift a diaphram or needle from a seat using a spring loaded ferrous stem under electromagnetic energy.

The electronic controller 80 is mounted, preferably in a box 84 on the frame support structure 22. The controller 80 provides an electrical circuit to actuate the solenoid valve 78 and is basically a microprocessor with a programmable time sequence and duration output. Again, any microprocessor having these functions will operate in the application, however, in the preferred embodiment a controller for watering lawns is preferred due to its adaptability, high volume, and low cost availability. This controller 80 includes time, date, operating days, time intervals, and time duration, as well as a readout for programming and manual override switches.

Figure 17:
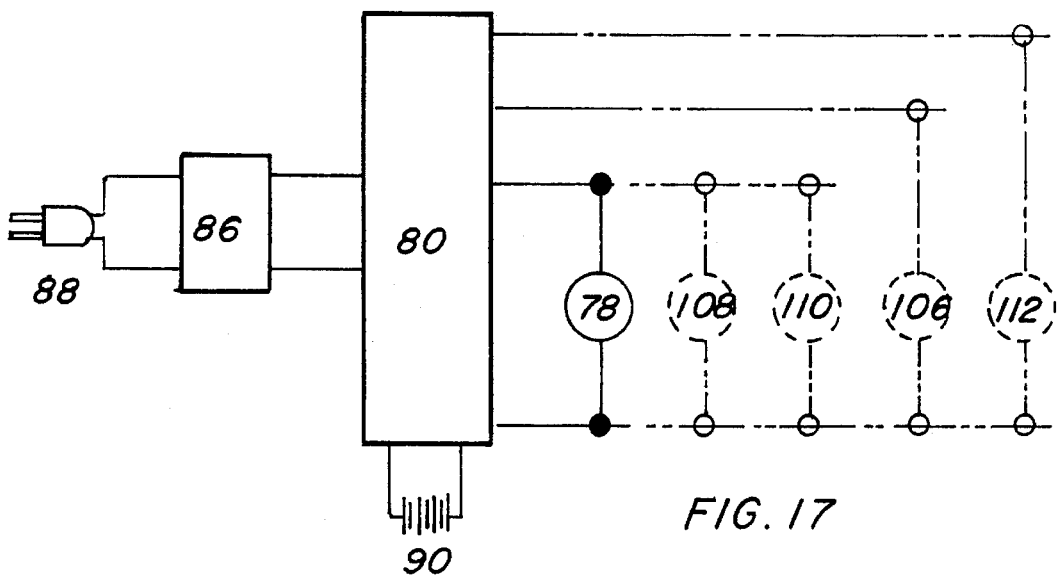
FIG. 17 is an electrical schematic diagram of the feeder with optional features shown with dotted lines.

FIG. 17 is the wiring schematic for the feeder and it should be noted that the entire system operates on 24 volt A.C., including the controller 80 and valve 78. This operating voltage necessitates a transformer 86 to reduce the 115 household voltage to 24 volts single phase 60 hertz. The power is introduced through a plug 88 and a 9 volt D.C. storage battery 90 is required by the controller to keep the memory volatile.

Reset means in the form of a tank return position spring 92 restore the measuring means to a replenished position after weight has been removed from the tank 58. The spring 92 is attached onto a bar 94 located between the outwardly extending arms 44 on one end and to frame vertical support structure 20 on the other. The spring 92 is the extension type and pulls the tank 58 upwardly simultaneously rotating the measure 38 into a reset position in preparation for a subsequent feeding cycle.

An optional enclosure 96, illustrated in FIGS. 1 and 6, having a hinged lid 98 and an animal access opening 100 is attached to the horizontal base 22. The enclosure 96 covers and protects the feeder from the elements and adds a degree of safety for children and the animals. The enclosure 96 may be made of sheet metal, thermoplastic, or any other material suitable for the purpose and simply slips over the top. The enclosure 96 includes openings for the water inlet and the power cord and plug. A slot is provided for the syphon tube 64 and a hole 104 is included for access to the controller box 84. It should be noted that if the optional enclosure is not used, the reservoir 32 would utilize the same hinged lid 98, as shown in FIG. 6, except small enough to fit the top of the reservoir exactly, or could omit the hinge and utilize a slip fit only.

An optional "on" indicating light 106 positioned on the lid of the controller box 84 is for designating that electrical power is supplied to the feeder. The light 106 is shown dotted in the schematic, FIG. 17.

An optional "feed cycle" indicating light 108 positioned on the lid of the controller box 84 is for designating that the feeder is operating during a timed feed cycle. Again, the light 108 is shown dotted in the FIG. 17 schematic.

Figure 10:
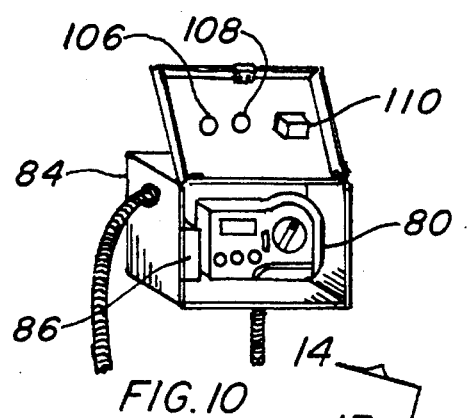
FIG. 10 is a partial isometric view of the electronic controller with the cover open, completely removed from the invention for clarity.
Figure 11:
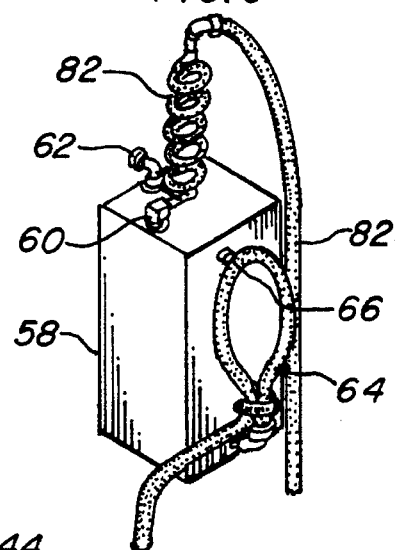
FIG. 11 is a partial isometric view of the water ballast tank with syphon and inlet piping, completely removed from the invention for clarity.

A direct readout cycle counter 110 may also be optionally included in the invention. The counter 110 is located adjacent to the indicating lights on the lid of the controller box 84, as shown in FIG. 10, and counts each feed cycle to indicate the amount of feed used which relates to how much feed remains in the reservoir 32. Again, the timer is indicated dotted in the electrical schematic, FIG. 17.

Figure 18:
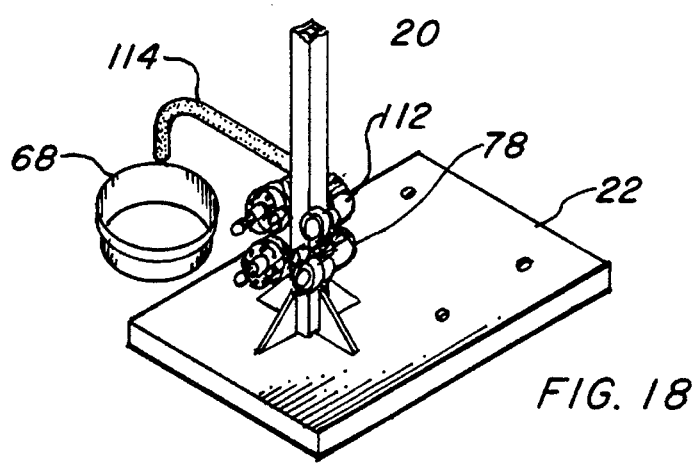
FIG. 18 is a partial isometric view of the optional water feed valve.

If desired for specific purposes, a separate animal watering solenoid valve 112 may be added adjacent to the water solenoid valve 78, as shown in FIG. 18. This second valve is identical to the first and is in parallel hydraulic communication on the inlet side using a common tee or wye fitting and is actuated by a separate circuit in the electronic controller 80. This valve 112 also includes a pipe outlet 114 that directs water over the separate water dish 68 and the syphon tube 64 is then used only as a waste dump for the water in the tank 58. As the animal watering solenoid valve 112 is completely independent, feed water may be furnished at separate predetermined frequencies and volumes, according to the animals needs.

In operation, the feeder is rolled into position and the brakes 30 on the casters 28 are set. Electrical house power, 115 volt, single phase, 60 hertz, is connected using an ordinary extension cord. Water is attached with a garden hose and a hose bib 116 is turned on. The reservoir 32 is filled with feed, lifting the lid 98 for access. The controller 80 is then programmed to the desired feeding cycle and a water dish 68 is placed beneath the syphon tube 64. The operation of the feeder is now completely automatic and the owner may safely leave the pet unattended for an extended period of time.

While the invention has been described in complete detail and pictorially shown in the accompanying drawings, it is not to be limited to such details, since many changes and modifications may be made in the invention without departing from the spirit and scope thereof. Hence, it is described to cover any and all modifications and forms which may come within the language and scope of the appended claims.

What is claimed is:

1. An automatic dry feed and water animal feeder comprising:

mounting means having a substantially rigid vertical structure on a horizontal base for resting on a flat surface, feed storage means attached to the mounting means vertical structure for retaining a reserve of animal feed, weight actuated feed measuring means in intimate relationship with the storage means for metering and dispensing a predetermined amount of feed and water from the storage means when weight is added, animal feed access means directly beneath the measuring means for receiving feed from the measuring means while providing a convenient receptacle for an animal to approach the feed, weight adding and timing means to sequence interval and duration of adding weight to the measuring means for automatic operation of the feeder, and reset means to restore the measuring means to a replenished position after weight has been removed therefrom.

2. An automatic dry feed and water animal feeder comprising:

a structural frame having a horizontal base and a vertical support, a feed reservoir having a funneled outlet, with flapper valve thereunder, attached to the frame vertical support, for retaining a reserve of animal feed, a weight actuated rotary feed measure having a cavity therein rotatably connected to the frame vertical support in intimate relationship with the feed reservoir outlet, also a pair of outwardly extending arms, the measure metering and dispensing a predetermined amount of animal feed from the feed reservoir when weight is added, a water ballast tank pivotally attached between the measure outwardly extending arms having a fill connection and air vent on top and a bottom syphon tube, the tank rotates the feed measure when filled with water and when full automatically empties, releasing water through the syphon tube for resetting and also to provide water for an animal, a feed bin having an access opening for an animal, attached to the horizontal base of the frame directly beneath the feed reservoir and encompassing the feed measure providing a receptacle for receiving dry feed, a water solenoid valve mounted on the frame vertical support supplying water to the ballast tank through the fill connection providing weight within the tank for actuation of the feed measure, an electronic controller mounted on the frame vertical support providing an electrical circuit to actuate the water solenoid valve at a preselected time interval and duration, and a tank return position spring attached between the feed measure arms and the frame for returning the feed measure with its attached ballast tank to a reset position with the measure receiving in the cavity a reserve of feed from the reservoir in preparation for a subsequent feeding cycle.

3. The animal feeder as recited in claim 2 further comprising an enclosure having an animal access opening, and a hinged lid attached to the horizontal base for covering and protecting the feeder.

4. The animal feeder as recited in claim 3 wherein said enclosure is metallic.

5. The animal feeder as recited in claim 3 wherein said enclosure is thermoplastic.

6. The animal feeder as recited in claim 2 wherein said frame horizontal base further comprises a plurality of casters attached thereunder providing mobility to the feeder and for ease of relocation.

7. The animal feeder as recited in claim 6 wherein said casters further comprise foot actuated locks integral therewith for securing the feeder in place.

8. The animal feeder as recited in claim 2 wherein said rotary feed measure further comprises a counterbalanced flapper valve adjacent to the cavity and reservoir flapper valve for insuring integrity of the measure when in a reset position.

9. The animal feeder as recited in claim 2 further comprising an "on" indicating light positioned integral with the controller for designating that electrical power is supplied to the feeder.

10. The animal feeder as recited in claim 2 further comprising a "feed cycle" indicating light positioned integral with the controller for designating that the feeder is operating during a timed feeding cycle.

11. The animal feeder as recited in claim 2 further comprising a cycle counter positioned integral with the controller for counting each feed cycle.

12. The animal feeder as recited in claim 2 further comprising an animal watering solenoid valve piped in parallel with the water solenoid valve and actuated by a separate circuit in the electronic controller for independently furnishing water to a bowl at predetermined frequencies and volumes autonomous from dry feeding of an animal.

* * * * *